United States Patent
Shah et al.

(10) Patent No.: US 8,818,434 B1
(45) Date of Patent: *Aug. 26, 2014

(54) METHOD AND SYSTEM FOR SMS MESSAGING VERIFICATION

(71) Applicant: Mobivity, Inc., Chandler, AZ (US)

(72) Inventors: Alex Shah, San Diego, CA (US); Dennis Becker, Chandler, AZ (US)

(73) Assignee: Mobivity, Inc., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/911,084

(22) Filed: Jun. 6, 2013

Related U.S. Application Data

(63) Continuation of application No. 13/477,000, filed on May 21, 2012, now Pat. No. 8,463,306.

(60) Provisional application No. 61/488,767, filed on May 22, 2011.

(51) Int. Cl.
    H04W 4/00 (2009.01)
    H04W 24/00 (2009.01)

(52) U.S. Cl.
    CPC .................................. H04W 24/00 (2013.01)
    USPC ........ 455/466; 455/414.1; 455/418; 455/419; 455/423

(58) Field of Classification Search
    USPC .................. 455/466, 414.1, 418, 419, 423
    See application file for complete search history.

(56) References Cited

U.S. PATENT DOCUMENTS

| | | | |
|---|---|---|---|
| 6,463,291 B1 * | 10/2002 | Lahtinen | 455/466 |
| 8,219,075 B2 | 7/2012 | Voss | |
| 8,260,966 B2 * | 9/2012 | Shatsky et al. | 709/248 |
| 2002/0177448 A1 | 11/2002 | Moran et al. | |
| 2006/0251127 A1 * | 11/2006 | Ishida et al. | 370/503 |
| 2007/0140127 A1 * | 6/2007 | Frei | 370/238 |
| 2007/0238450 A1 | 10/2007 | Hogberg | |
| 2008/0125146 A1 * | 5/2008 | Bainbridge | 455/466 |

* cited by examiner

*Primary Examiner* — Olumide T Ajibade Akonai

(74) *Attorney, Agent, or Firm* — Clause Eight IPS; Michael Catania

(57) ABSTRACT

A method and system for testing a SMS text messaging network is disclosed herein. The method and system allows for real-time testing of the mobile terminated ("MT") and mobile originated ("MO") delivery delays across the major American mobile phone carriers, and accurately measures the progress on SMS broadcasts and records when a broadcast has been completed.

3 Claims, 4 Drawing Sheets

METHOD AND SYSTEM FOR SMS MESSAGING VERIFICATION

CROSS REFERENCES TO RELATED APPLICATIONS

The present application is a continuation application of U.S. patent application Ser. No. 13/477,000, filed on May 21, 2012, which claims priority to U.S. Patent Application No. 61/488,767, filed on May 22, 2011, both of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to verification of a text messaging system.

2. Description of the Related Art

Text messaging campaigns have become routine to market/advertise a product, service, political position, political candidate and the like. Organizations (whether companies, non-profits, political parties, unions, broadcasters, schools and the like) spend enormous resources trying to get their message to their intended audience. Many times these text messaging campaigns are time sensitive. For example, if a political organization wants an intended audience to watch to a broadcast of a candidate, the text messaging campaign would be worthless if the text message informing the intended audience of the broadcast wasn't received by the intended audience until after the broadcast ended.

General definitions for terms utilized in the pertinent art are set forth below.

Interactive voice response ("IVR") is a telephone technology in which a user uses a phone to interact with a database to acquire information.

Short Message Service ("SMS") is text messaging communication using a mobile phone or other device.

Mobile Originated ("MO") is a text message that is sent from a mobile phone.

Mobile Terminated ("MT") is a text message that is sent to a mobile phone.

APP is a software application for a mobile phone such as a smart phone.

Hypertext Transfer Protocol ("HTTP") is a set of conventions for controlling the transfer of information via the Internet from a web server computer to a client computer, and also from a client computer to a web server.

Internet is the worldwide, decentralized totality of server computers and data-transmission paths which can supply information to a connected and browser-equipped client computer, and can receive and forward information entered from the client computer.

FTP or File Transfer Protocol is a protocol for moving files over the Internet from one computer to another.

Transfer Control Protocol/Internet Protocol ("TCP/IP") is a protocol for moving files over the Internet.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Direct Inward Dialing ("DID") involves a carrier providing one or more trunk lines to a customer for connection to the customer's private branch exchange ("PBX") and a range of telephone lines are allocated to this line.

Voice over Internet Protocol ("VoIP") relates to communications transmitted over the Internet such as SKYPE.

URL or Uniform Resource Locator is a address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

The prior art has failed to provide a universal method and system for verification of text messaging delays.

BRIEF SUMMARY OF THE INVENTION

An Object of the invention is to measure the mobile terminated ("MT") and mobile originated ("MO") delivery delays across the four major American mobile phone carriers, VERIZON, AT&T, T-MOBILE and SPRINT.

Another object of the invention is to accurately measure progress on SMS broadcasts and record when a broadcast has been completed.

Another object of the invention is to detect multiple MOs and MTs and notify a system operator.

Another object of the invention is to detect when MOs and MTs are not received by a certain threshold time and notify an operator.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

A preferred embodiment of the present invention is a verification of the timeliness of a text messaging system. At some specific interval (every five minutes), a ping service records a timestamp in a database and receives a unique identification for the specific ping request.

The PING service then leverages SendDynamicsSMS.aspx to send an SMS message down to each carrier.

An ADROID SMS PONG app is triggered upon receipt of the SMS message to 772937 short code, and then calls the PONG.HTTP service over HTTP with the id provided in the SMS text message.

The ANDROID SMSPONG app then replies to the SMS text message with the message "pong[id]".

After receipt of the pong text message by C4, C4 calls the Pong.SMS service with the given id.

The ANDROID app is preferably installed on customer mobile phones at various geographic locations with various carriers for greater robustness of the verification system.

Figure 1:
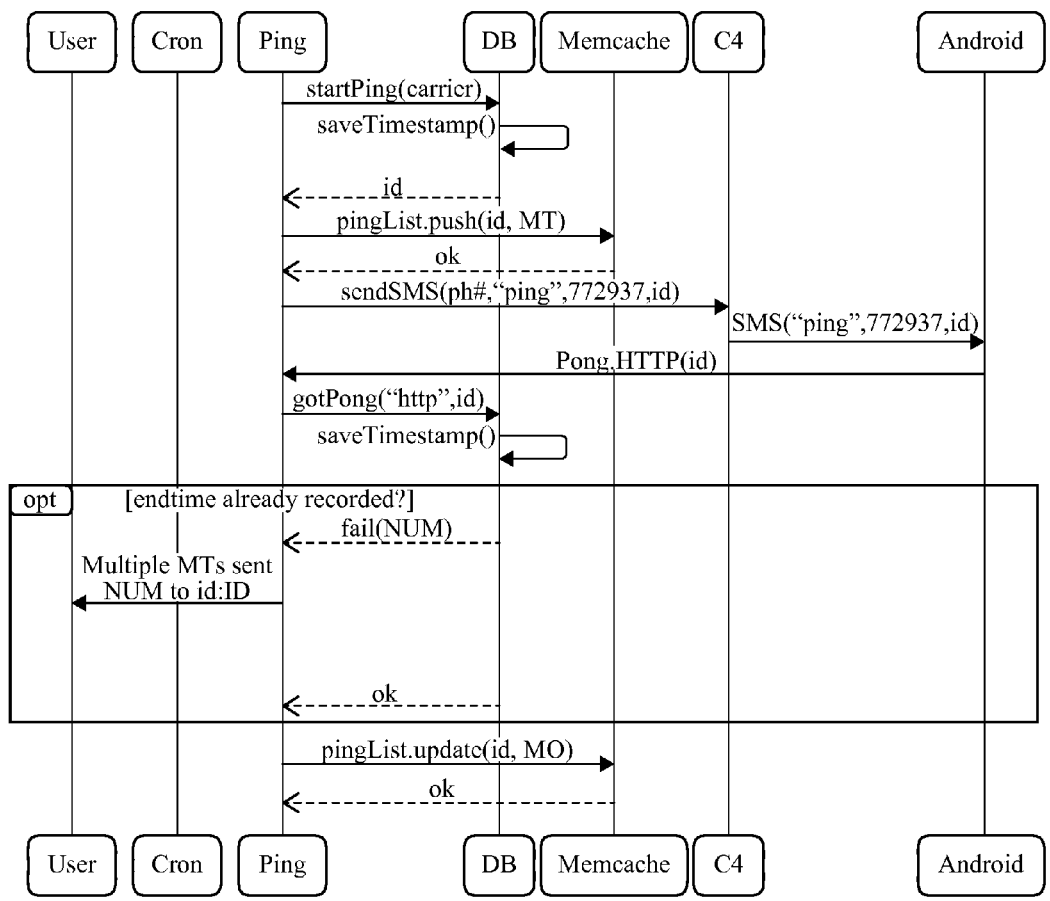
FIG. 1 is a flow diagram of a SMS PING MT service of the present invention.

FIG. 1 is a flow diagram of a SMS PING MT service of the invention. As shown in FIG. 1, the SMS MT delivery time is recorded by leveraging HTTP over WIFI so that the end timestamp is not affected by delays introduced by a carrier network. The end time for the MT PING also gives the start time for the SMS MO PING.

Figure 2:
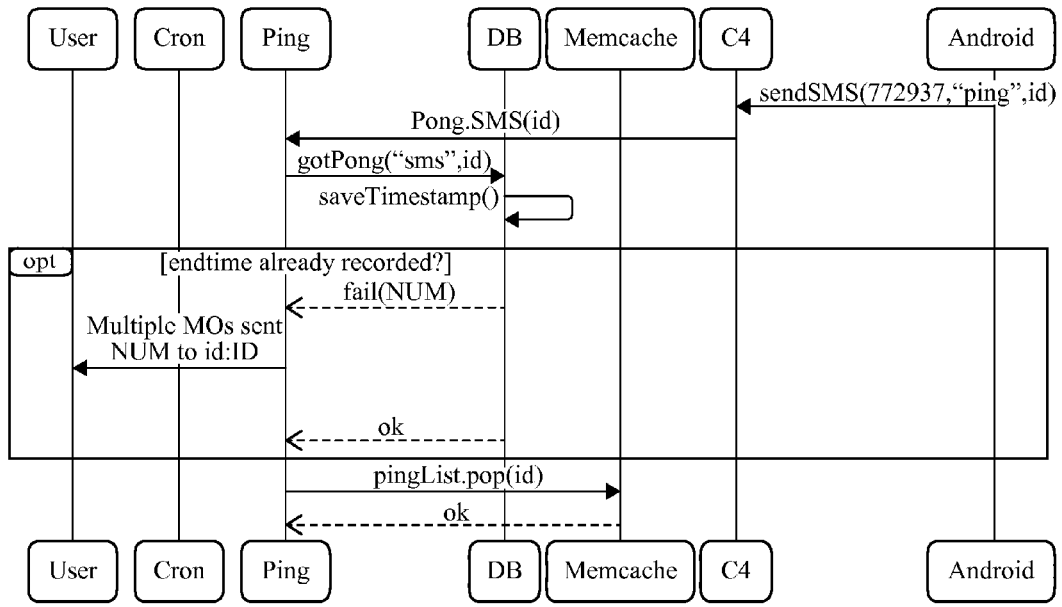
FIG. 2 is a flow diagram of a PING MO service of the present invention.

FIG. 2 is a flow diagram of a SMS PING MO service of the invention. The SMS PING MO service is preferably executed after receiving a PING MT message. The last step of the SMS PING MT service is the transmission of an HTTP request from the mobile phone to the PING service, which allows for this step to be the start time for the MO PING service. In this manner, a precise measurement of the MT time and the MO time from an actual phone is possible using the present invention. The prior art PING services only provide round trip times.

Figure 3:
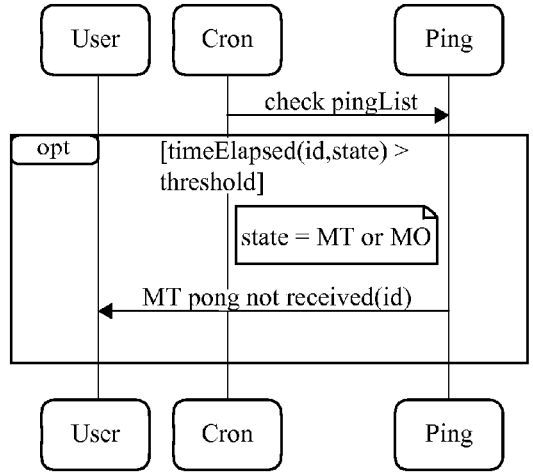
FIG. 3 is a flow diagram of a PING PONG monitoring service of the present invention.

FIG. 3 is a flow diagram of a PING PONG monitoring service of the invention. A cronjob runs every minute to verify that there are not any PING MT messages or PING MO messages which have not been received.

Figure 4:
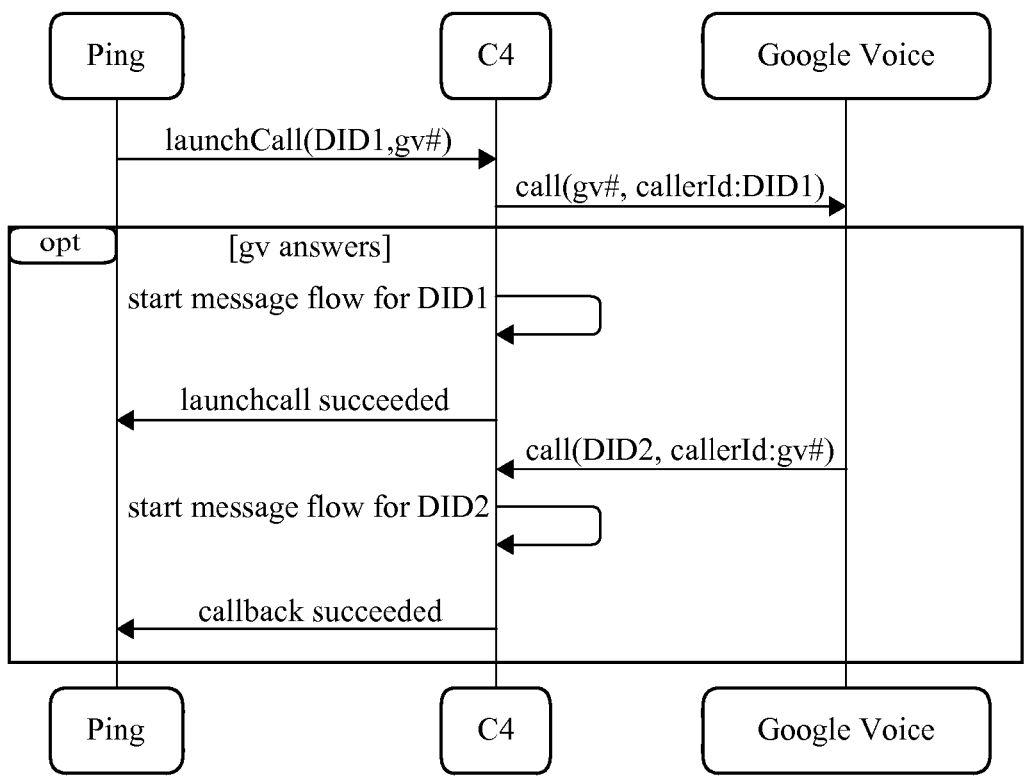
FIG. 4 is a flow diagram of a carrier IVR monitoring method of the present invention.

FIG. 4 is a flow diagram of a C4 IVR monitoring. FIG. 4 illustrates how a PING is sent to the C4 IVR system. Preferably a dedicated DID is used to verify the uptime of the entire system.

In one example, a C4 account for two campaigns in it was created, with one campaign for a PING service and one for a scripted sanity check.

PING: id-int, autoincrement, primary
createTime-timestamp
shortcode-int
carrier VERIZON, SPRINT, AT&T, T-MOBILE.
PONG
id-int, autoincrement, primary
pinged
responseTime-timestamp
typ-'http', 'sms'

The time between pnig table createTime and the corresponding PONG HTTP response Time is MT dealy. The time between PONG HTTP repsonseTime and the PONG SMS responseTIme is the MO dealy.

The present invention preferably does not need a newly created infrastructure and can be implemented using an existing communications infrastructure.

Preferred telephonic computing devices utilized with the present invention include the IPHONE® smartphone from Apple, Inc., BLACKBERRY® smartphones from Research In Motion, the ANDROID® smartphone from Google, Inc., the TRE® smartphone from Palm, Inc., and many more.

Figure 5:
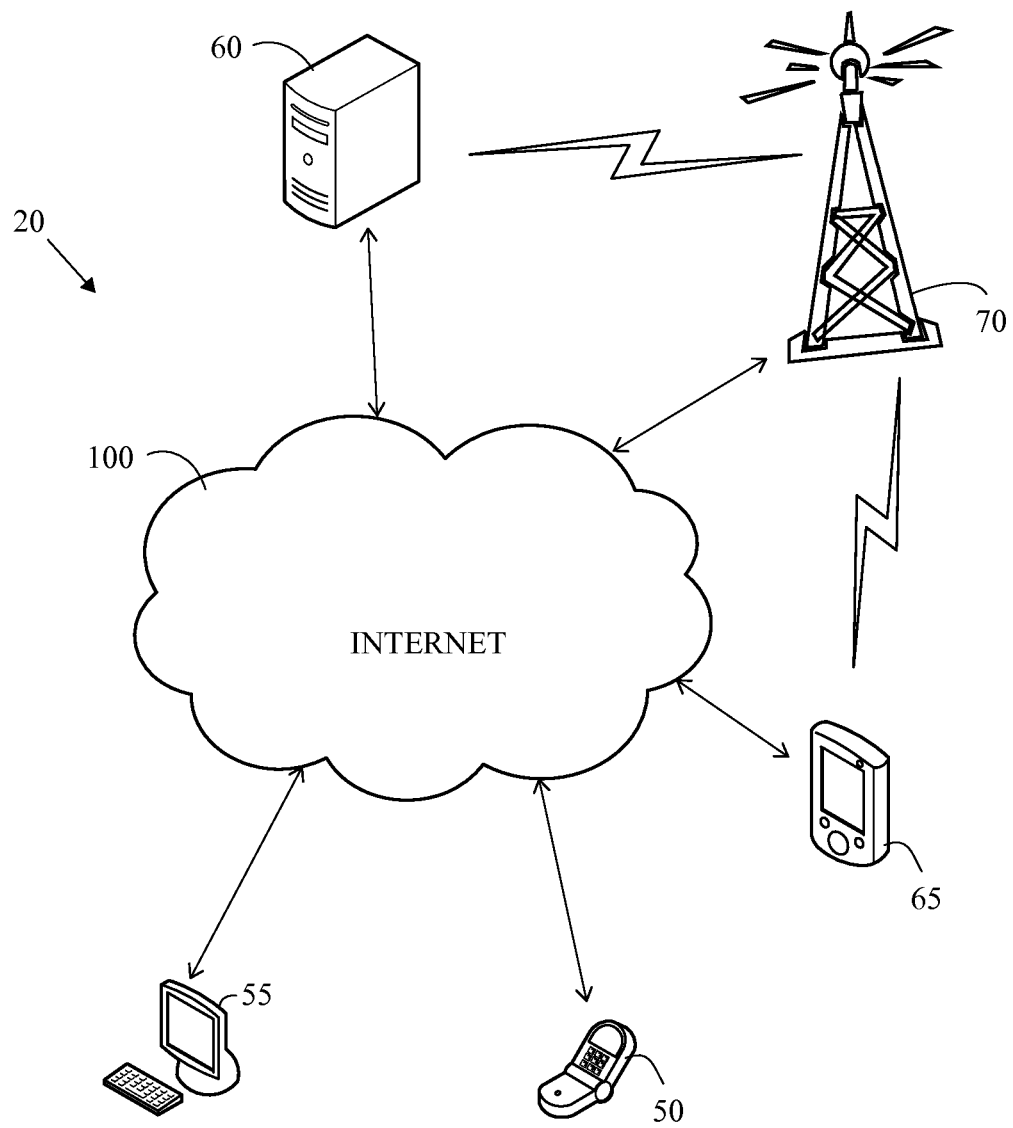
FIG. 5 is a system of the invention.

FIG. 5 illustrates a system of the invention with at least one server, a network (represented by antenna tower), mobile phones, and computers.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for testing a SMS text messaging network, the method comprising:
   transmitting a ping to get a timestamp;
   recording the timestamp in a database;
   receiving a unique identification for the timestamp at a testing server;
   transmitting a first SMS text message with the identification from the testing server to at least one network phone carrier;
   transmitting the first SMS text message from the at least one network phone carrier to a mobile phone;
   activating a mobile phone software application on the mobile phone upon receipt of the SMS text message;
   transmitting a second SMS text message from the mobile phone to the at least one network carrier;
   transmitting the second SMS text message from the at least one network carrier to the testing server; and
   calculating a delay in a mobile phone receiving the first SMS text message.

2. The method accord to claim 1 wherein the mobile phone is a smartphone.

3. The method accord to claim 1 further comprising transmitting the calculated delay to a user.

\* \* \* \* \*